June 30, 1936.  R. H. BERG  2,045,566
TRUCK AND TRAILER LOADING AND UNLOADING DEVICE
Filed June 7, 1935   5 Sheets-Sheet 1
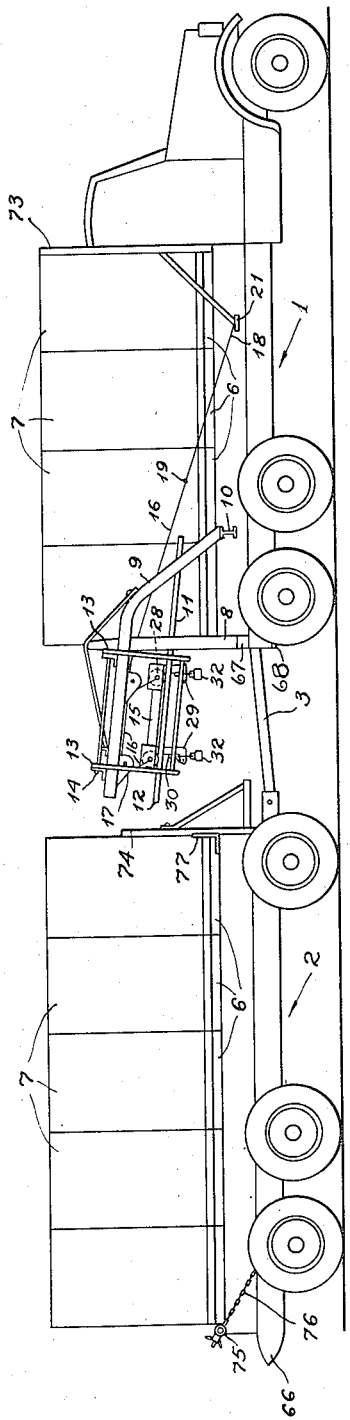
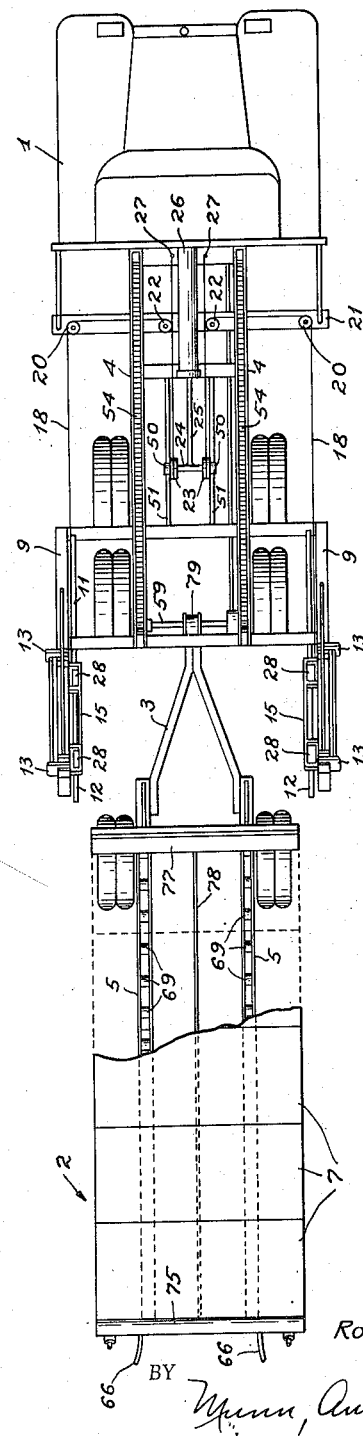
INVENTOR.
ROBERT H. BERG
BY
ATTORNEY.

June 30, 1936. R. H. BERG 2,045,566
TRUCK AND TRAILER LOADING AND UNLOADING DEVICE
Filed June 7, 1935 5 Sheets-Sheet 2
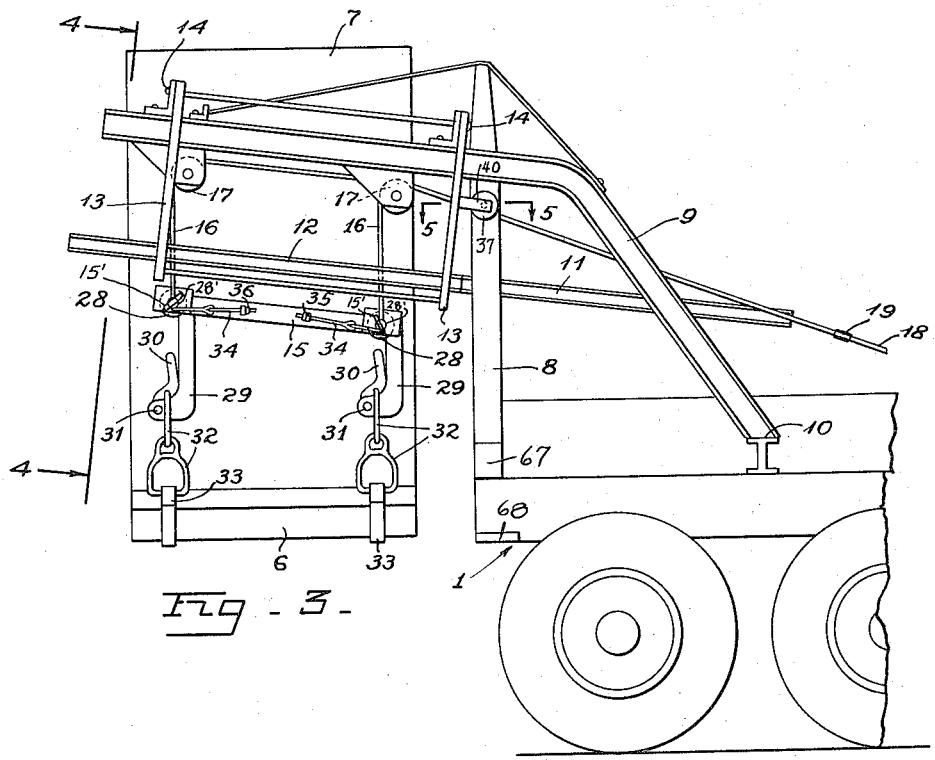
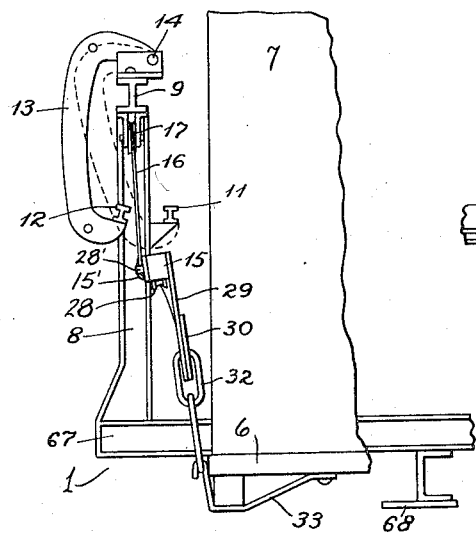
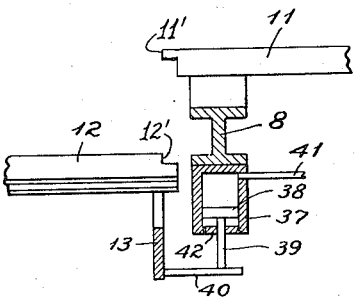
INVENTOR.
ROBERT H. BERG.
BY Munn, Anderson & Liddy
ATTORNEY.

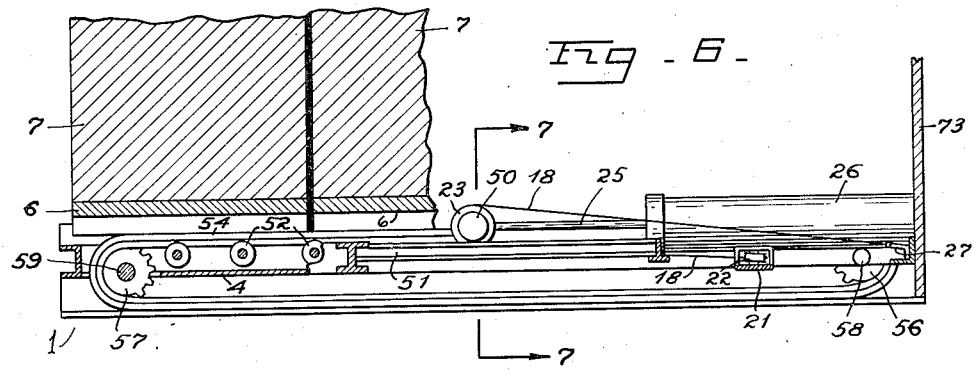

June 30, 1936.　　　　R. H. BERG　　　　2,045,566
TRUCK AND TRAILER LOADING AND UNLOADING DEVICE
Filed June 7, 1935　　　5 Sheets-Sheet 5

INVENTOR.
ROBERT H. BERG
BY Munn Anderson & Lii
ATTORNEYS.

Patented June 30, 1936

2,045,566

UNITED STATES PATENT OFFICE 2,045,566

TRUCK AND TRAILER LOADING AND UNLOADING DEVICE

Robert H. Berg, San Francisco, Calif.

Application June 7, 1935, Serial No. 25,504

13 Claims. (Cl. 214—65)

My invention relates to improvements in truck and trailer loading and unloading devices, and it consists of the combinations, constructions and arrangements hereinafter described and claimed.

A flat-bed truck can carry more material known as "pay load" than a self-dumping truck because in the self-dumping truck the body has to be made stronger in order to support the load during the tilting operation. Also mechanism must be provided for swinging the body into dumping position, and this adds weight to the truck.

Only predetermined weights are allowed on the highways and it is self-evident that if the truck is made lighter in weight it can carry a greater load, and this will result in cutting down the cost of transporting the material from the place of manufacture to the place of delivery.

The principal object of my invention is to provide a device which has the advantages of a flat-bed truck in that a greater pay load can be carried than is possible with a self-dumping truck, and which has the further advantage of permitting the pay load to be disposed on the truck, and to be removed therefrom, thus accomplishing the additional advantage of a quick loading and unloading of the truck.

In self-dumping trucks where the platform is tilted during the dumping operation, the material forming the load is mixed up and is scattered over a large area due to the manner of dumping it. In my present device the load can be stacked neatly on decks, and these decks can be individually lifted and placed on the truck chassis without disturbing the load carried by the decks. The decks when assembled on the truck chassis form the truck body. In other words, I form the truck body from a number of units, and I simultaneously load the truck as each unit is placed in position. The decks are maintained in a horizontal position from the time they are lifted from the ground until the time they are disposed on the truck chassis, and this will permit loads of considerable height to be moved. In unloading the decks are merely removed one at a time, and the load on each deck is undisturbed during the unloading operation.

I also make use of a trailer and operatively connect this trailer to the truck in a novel manner so that the load can be transferred as a unit from the truck to the trailer and vice versa. The body of the trailer is formed from the decks in the same manner as the body of the truck. The truck and trailer can therefore be made lighter in construction than is now possible with standard equipment, and this will permit a greater "pay load" to be carried on each trip.

Other objects and advantages will appear in the following specification, and the novel features of the device will be particularly pointed out in the appended claims.

My invention is illustrated in the accompanying drawings forming a part of this application, in which Figure 1 is a side elevation of the truck and trailer loaded;

Figure 2 is a plan view of Figure 1 showing the truck unloaded and the trailer partially unloaded in order to show the mechanism;

Figure 3 is an enlarged side elevation of the truck loading and unloading means;

Figure 4 is a section along the line 4—4 of Figure 3;

Figure 5 is a section along the line 5—5 of Figure 4;

Figure 6 is a longitudinal section through a portion of the truck showing different parts of the mechanism, portions of the mechanism being shown in elevation;

Figure 7 is a section along the line 7—7 of Figure 6;

Figure 8 illustrates how the truck and trailer can be temporarily connected during the transferring of the load from one to the other;

Figure 9:
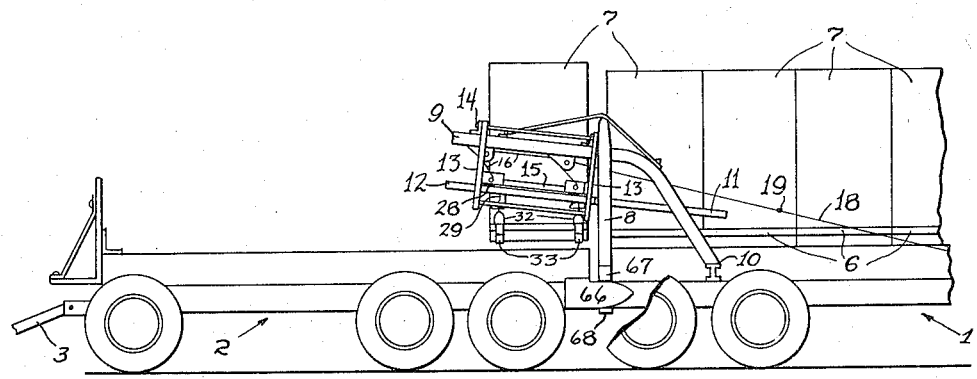
Figure 9 shows the truck lifting the last load from the trailer.

In carrying out my invention I make use of a truck indicated generally at 1, and a trailer indicated generally at 2, the trailer being connected to the truck by a tongue 3 in the usual manner. The construction of the truck and the trailer forms no part of my invention. Both truck and trailer are provided with longitudinally extending channels indicated at 4—4 for the truck and 5—5 for the trailer, see Figure 2. These channels removably support decks 6, see Figure 1, and these decks in turn carry the load indicated at 7, and when the decks are placed side by side on the truck and on the trailer they form the flat-bed bottom for the load. Figure 7 shows the outer sides of the channels 4—4 higher and these sides abut the runners 4' of the decks 6 and hold the decks against transverse movement. I will first describe the mechanism for lifting the decks one at a time and for placing these on the guide channels. I will then describe the mechanism for moving the decks along the truck, and will finally describe the mechanism for transferring the load from the truck to the trailer.

In Figures 3 and 4 I show an upright 8. Two of these uprights are provided at the rear of the truck, and each supports an identical deck-lifting mechanism. A description of one will therefore suffice. A supporting arm 9 extends across the top of the upright 8 and projects rearwardly of the truck. The inner end of the arm 9 is secured to the truck as at 10. The upright 8 and and the arm 9 support a gravity rail 11. A swinging rail 12 is normally aligned with the rail 11, and is carried by arms 13 which are pivoted at 14 to the arm 9. Figure 4 illustrates how the arms 13 will swing by gravity from the full line position into the dotted line position.

A carrier 15, see Figure 3, has cables 16 adjustably connected thereto, and these cables are passed over pulleys 17 supported by the arm 9 and the ends of the cables are connected to a common cable 18 at 19. Figure 2 shows the cables 18 from both of the lifting devices as being passed around pulleys 20 carried by a transverse member 21, which in turn is supported by the truck 1. The cables 18 are then passed around a second set of pulleys 22, and thence around a set of pulleys 23 mounted on a cross shaft 24. The shaft 24 is connected to a piston rod 25 and the piston, not shown, slides in a hydraulic cylinder 26. The cables 18, after being passed around the pulleys 23, have their ends connected to the truck frame 1 at 27.

It will be seen from this construction that a movement of the piston rod 25 to the left in Figure 2 will take up on the cables 18, and these cables in turn will raise the cables 16 and lift the carriers 15. An opposite movement of the piston rod 25 will lower the carriers 15.

The carrier is provided with rollers 28 and these are designed to be lifted into supporting relation with the swingable rail section 12. Figure 9 shows the carrier 15 supported by the rail section 12 and so does also Figure 1. The carrier 15 has depending arms 29, and these pivotally carry levers 30 at 31. The levers 30 in turn pivotally carry links 32, and the lower link is removably connected to hooks 33 secured to the deck 6. Figures 3 and 4 show the carrier 15 supporting a deck 6 with its load 7, and these figures illustrate the lifting of the load onto the truck, or the removal of the load from the truck.

Figure 3 shows the cables 16 being passed through openings in the shafts which support the rollers 28, and then the free ends of the cables are connected to bolts 34 which, in turn, are passed through eyelets 35 integral with the carrier 15. Nuts 36 mounted on the bolts can be adjusted for varying the length of the cable 16, and in this way the carrier 15 can be properly positioned.

Any means for swinging the arms 13 outwardly for permitting the carrier 15 to pass the swinging rail sections 12 may be used. In Figure 5 I have shown a fluid cylinder 37 attached to the upright 8. A piston 38 is mounted in the cylinder and has a projection 39 bearing against a projection 40 carried by the right-hand arm 13 shown in Figure 3. A conduit 41 admits fluid to the cylinder and causes the piston 38 to move outwardly and to swing the arms 13 from the dotted line position into the full line position as shown in Figure 4. The cylinder has a removable head 42 for limiting the outward movement of the piston 38. The inward movement of the piston is determined by the swinging of the arms 13 back into normal position. Any means for admitting air or fluid into the conduit 41 may be used, and a valve may also be connected in the conduit for controlling the flow of air or fluid to the piston. Two cylinders 37 and two pistons 38 are used for simultaneously moving the rail sections 12 away from each other.

Figure 11:
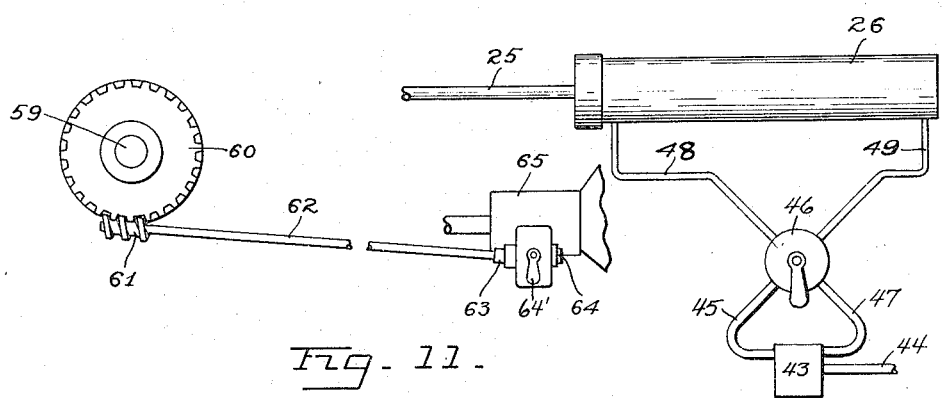
Figure 11 is a schematic showing of a portion of the actuating mechanism.

In loading a deck 6 onto the truck, the links 32 are connected to the hooks 33 of the deck, see Figure 3, and then fluid is admitted to the cylinder 26 so as to move the piston rod 25 to the left in Figures 2 and 11. In Figure 11 I have indicated diagrammatically how fluid is fed to the desired end of the cylinder 26. A fluid pump 43 is operated by a shaft 44. A pipe 45 leads from the pump 43 to a four-way valve 46, and a second pipe 47 leads from the valve back to the pump. Two pipes 48 and 49 lead from the valve 46 to opposite ends of the cylinder 26. The handle of the valve 46 is swung for connecting the pipe 45 with the pipe 49 and this will move the piston to the left as already stated. At the same time the pipe 47 will be connected with the pipe 48 so that the fluid at the front of the cylinder can return to the pump. The movement of the piston in the cylinder can be stopped by swinging the handle into the position shown, which is neutral. The fluid pumped by the pump 43 will now pass through the pipes 45 and 47 so that the pump can continue to operate. When the valve handle is turned for connecting the pipes 45 and 48 together and the pipes 47 and 49 together, the piston will be moved in the opposite direction.

Figure 12:
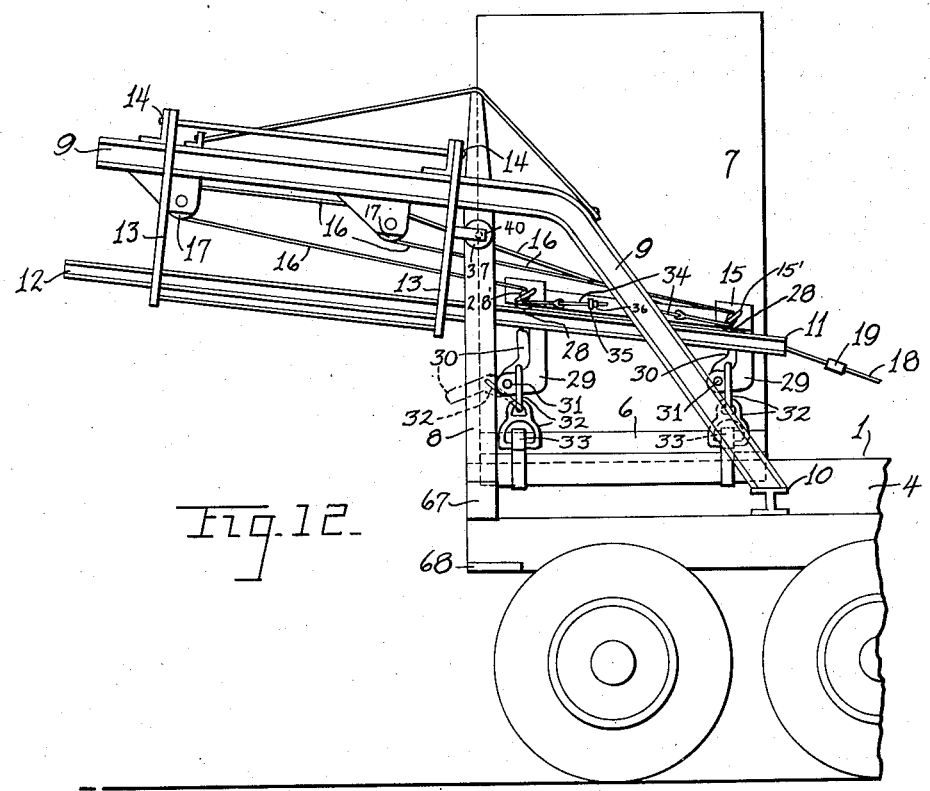
Figure 12 is a view similar to Figure 3, but illustrates the position of the deck as it initially comes to rest on the truck.

The moving of the piston rod 25 outwardly will raise the cables 16, and these in turn will lift the carriers 15 and the deck 6. The swinging rail sections 12 bear against the cables 16 during the lifting of the deck and the carriers 15 have arcuate portions 15' that prevent the roller shafts 28' from striking the rail sections as they pass the rails. After the carriers 15 have passed the rail sections 12, they will swing by gravity back into alignment with the gravity rail. A stop 11' on the section 11 enters a recess 12' in the section 12 and aligns the two sections. The fluid is now permitted to enter the left-hand end of the cylinder 26, and to leave the right-hand end for causing the piston rod 25 to move to the right. This will permit the cables 16 to lower the load until the rollers 28 of the carriers 15 rest on the rail sections 12. The load will now be carried by the rail sections, and it will move to the right in Figure 3 as additional slack is fed into the cables 16. The carriers are moved from the rail sections 12 onto the rail sections 11 by gravity until the deck 6 finally comes to rest on the endless chain 54. Figure 12 shows the deck 6 as initially coming to rest on the chains 54 and as just being freed from the carriers 15. The left-hand lever 30 is shown swung for freeing the links 32 from the hook 33. The links 32 on the right-hand lever 30 are loose in the right-hand hook 33 and this will permit the lever to be swung over dead center for unfastening the links.

It might be well to note at this point that the shaft 24 is provided with rollers 50 that ride on supports 51, see Figures 2 and 6. The positioning of the cables 18 is such as to tend to move the piston rod 25 downwardly when a load is placed on the cables, and this will hold the rollers 50 down upon the supports 51.

I will now describe the means for moving the deck 6 on the truck after the deck has been freed from the carriers 15. In Figure 7 I show the guide channels 4—4 as rotatably carrying a plurality of rollers 52. These rollers are provided with annular and centrally disposed recesses 53. An endless chain 54 is carried by the rollers, and the link sections of the chain have outwardly extending flanges 55 that ride on the tops of the rollers 52. Figure 6 shows the chain 54 as being endless, and as extending throughout the length of the truck. The chain is passed around the sprocket 56 disposed at the front of the guide channels 4, and is passed around a second sprocket 57 disposed at the rear of the guide channels. Since two chains 54 are provided, two sprockets 56 and 57 are also used. The sprockets 56 are mounted on stub shafts 58 supported in the guide channels 4, while the sprockets 57 are keyed or otherwise secured to a drive shaft 59. Figure 11 shows the drive shaft 59 as carrying a worm gear 60, and meshing with a worm 61 mounted on a shaft 62. The shaft 62 in turn is connected by a universal joint 63 to a shaft 64 that is operatively connectible to an auxiliary transmission 65, by means of a handle 64'. The transmission 65 is operatively connected to the truck transmission, not shown. It is obvious that any other reversible power take off for rotating the shaft 62 can be used. The swinging of the handle 64' in one direction from the neutral position shown will cause the auxiliary transmission to rotate the shaft 62 in one direction. A swinging of the handle 64' in the opposite direction from neutral will cause the shaft 62 to oppositely rotate. When the shaft is rotated in one direction the chains 54 will carry the decks 6 toward the front of the truck, and the opposite is true when the shaft 62 is rotated in the reverse direction.

After the operator has deposited the deck 6 on the endless chains 54, he causes the shaft 62 to operate to move the deck forwardly on the truck a short distance. He then picks up a second loaded deck and causes this to be supported and to move slowly down the gravity rails 11 in the manner already described. When the load of the second deck contacts with the load on the first deck, the endless chains 54 are again actuated for moving the first load forwardly on the truck. At the same time slack is fed into the cables 16, and this will permit the second load to continue to contact with the first load as the second load travels along the rail sections 11 and is lowered onto the endless chains 54. It will therefore be seen that when the second deck finally comes to rest on the endless chains 54, it will contact with the first deck and the two loads carried by the two decks will also contact with each other, and thereby form a single load and body composed of the two decks and the two load units.

In the same manner additional loaded decks are raised and are moved onto the truck until the truck is provided with its full quota of loads. In Figure 1 I show the truck as carrying four decks and four loads. The truck can be constructed to carry a different number of decks than that shown.

It is now possible to transfer not only the four loaded decks to a trailer, but to also at the same time deposit an additional loaded deck on the trailer so that the trailer will support one load unit in addition to that carried by the truck. Figure 1 shows the trailer carrying five load units. Reference to Figure 9 shows the deck-lifting device as supporting a loaded deck, the load being temporarily carried by the swinging rails 12. The truck already carries its full quota of load units amounting to four in the present showing.

As already stated, the trailer 2 has guide channels 5—5 which are spaced apart the same distance as the guide channels 4—4 of the truck. The rear end of the trailer carries positioning members 66, and Figures 8 and 9 show the rear of the trailer disposed adjacent to the rear of the truck so that the positioning members 66 will be disposed on opposite sides of the truck frame 1. The frame 1 has an overhanging portion 67 and a projection 68 which define a recess for receiving the positioning members 66. Figure 9 shows the members in engagement with the truck chassis 1 and being received between the projecting portions 67 and 68. By this simple arrangement the guides 5—5 of the trailer 2 are not only aligned with the guides 4—4 of the truck, but are also positioned horizontally in the same plane.

When this is accomplished, the fifth deck supported by the lifting mechanism shown in Figure 9 will be positioned above the trailer. The operator now lowers the fifth deck onto the guide channels 5—5 by first temporarily raising the carriers 15 to free them from the rail sections 12 and then swinging the rail sections 12 outwardly and finally lowering the deck 6 onto the guide channels 5—5.

Figure 13:
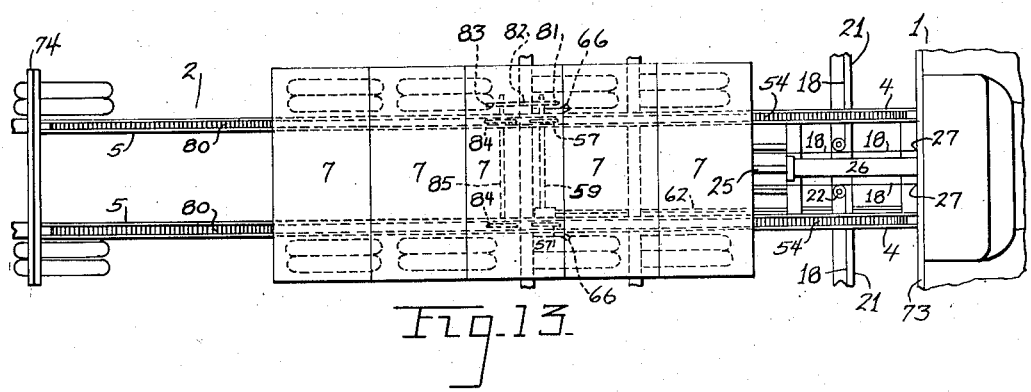
Figure 13 shows a plan view of the trailer and truck connected together and transferring a load.

If desired endless chains 80, see Figure 13, can extend throughout the lengths of the guide channels 5—5, these chains being similar to the chains 54. These chains can be caused to move at the same speed as the chains 54 by merely interconnecting the two chains, such as by providing a sprocket 81 on the shaft 59, and connecting the sprocket by a chain 82 to a sprocket 83 on the trailer, this latter sprocket being operatively connected to the endless chain sprockets 84 through a common shaft 85 disposed at the rear of the trailer. This mechanism is shown in Figure 13 where I also show the rear of the trailer temporarily connected to the truck. The drawings illustrate the tranferring of the load units as a single load from the truck to the trailer or vice versa. One of the units is shown bridging the space between the chains 54 and the chains 80.

In Figure 2 I have shown a plurality of rollers 69 mounted in the guide channels 5—5 of the trailer. These rollers support the decks 6 with their loads. After the fifth deck has been lowered onto the rollers 69, the endless chains 54 are reversed in their movement for moving the four decks on the truck to the trailer. These decks will move the fifth deck with them since the trailer can support five load units instead of four. If the endless chains 80 are used on the trailer, they will be moved at the same speed as the chains 54 for transferring the load units as a single load.

Figures 10, 14:
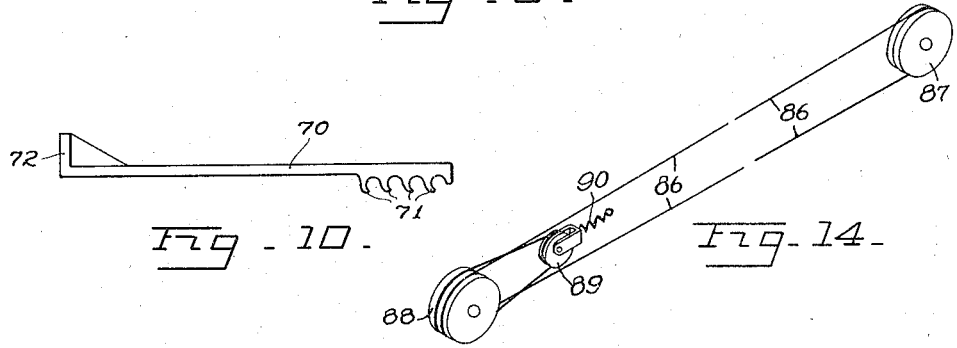
Figure 10 shows a side elevation of a pusher used in connection with the device.
Figure 14 is an isometric view showing an endless cable.

In order to cause the last deck, i. e. the front one, to move entirely off from the truck and onto the trailer, I provide pushers indicated generally at 70, in Figure 10. Two pushers are used, and these have fingers 71 designed to engage with the links in the chains 54. The heads 72 of the pushers bear against the front deck 6 and move this deck entirely off from the truck and onto the trailer.

It will be noted that a head board 73 is mounted at the front of the truck, and a head board 74 is mounted at the front of the trailer. The five decks are moved onto the trailer until the load abuts the head board 74. The load can then be held in place by means of a rod 75 that extends across the rear of the trailer and is held in place by chains 76 or other suitable fastening means.

The truck is now detached from the trailer and four additional units are added to the truck. The truck is now connected to the trailer 2 by means of the tongue 3 and the entire load consisting of nine units is ready to be transported.

After the load reaches its destination the truck is first unloaded unit by unit, and these units can be placed at any points desired, and at different elevations. The loads supported by the units are not disturbed during this unloading process. The empty truck is now temporarily attached to the trailer by means of the members 66, and the load is transferred from the trailer to the truck.

In the showing of Figures 1 and 2, this is accomplished by means of an angle iron 77 which is disposed adjacent to the head board 74. A cable 78 extends from the angle iron and is disposed beneath the load units. The free end of this cable is temporarily passed around a drum 79 mounted on the shaft 59. The shaft 59 is now caused to rotate and will wind the cable 78 and cause the angle iron 77 to move four of the load units 7 off the trailer and onto the truck. The last load unit is now lifted by the carriers 15 and is temporarily supported by the rails 12. The truck is now disconnected from the trailer, and the five units carried by the truck can all be deposited at one place, or can be deposited at different points. It should be remembered that during the unloading of the decks and also during the loading of the decks, the decks remain in a horizontal position and therefore support the load. The decks can be unloaded on places of elevation equal to the height of the rail sections 12. It is obvious that the decks can be lowered to points below the ground level up to the extent of the length of the cables 16 and 18.

If the endless chains 88 are used on the guides 5—5, as shown in Figure 13 instead of the rollers 69, as shown in Figure 2, the angle iron 77, the cable 78 and the drum 79 can be dispensed with. In this event the endless chains 80 on the trailer would be operatively connected to the chains 54 on the truck by the endless chain 82 and the sprockets 81 and 83 and the two endless chains 54 and 80 would move in unison for transferring the four load units from the trailer to the truck.

It should also be noted that the load is not swung onto its side in being lifted onto the truck or deposited from the truck, and this permits a higher load on a deck to be carried than would otherwise be permitted. Furthermore, a greater pay load can thus be mounted on the truck. There is no load supporting body for the truck except that formed by the decks abutting edge to edge. The load does not leave the deck at any point of transportation, and this permits a quick handling of the load by disposing of it in units. There is only one actual connection between the truck and the trailer during the loading when transferring the load units from the truck to the trailer, and there is likewise only one connection between the truck and the trailer during the unloading when transferring the load units from the trailer back to the truck.

In Figure 14 I show an endless cable 86 that can take the place of the endless chains 54 and 80. The cable functions in identically the same manner as the chains and is supported by the grooved rollers 52. The cable is thick enough to extend above the grooves and carries the decks 6.

In place of the sprockets 56 and 57 on the truck and the sprockets 84 on the trailer I provide a single grooved pulley 87 and a double grooved pulley 88. Two of each of the pulleys 87 and 88 are provided for the truck and a similar number for the trailer. The pulleys 88 on the truck are mounted on the shaft 59 and the pulleys 88 on the trailer are mounted on the shaft 85.

An automatic cable tightener is provided and consists of a floating pulley 89 around which a portion of the cable 86 is wrapped. Figure 14 shows the cable 86 looped around one groove in the pulley 88, then around the pulley 89 and then back around the other groove in the pulley 88. A spring 90 exerts a continual force on the cable which frictionally connects the cable to the pulley and causes the cable to move the loaded decks resting thereon when the pulleys 88 are rotated.

While I have shown only the preferred forms of my invention, it should be understood that various changes or modifications may be made within the scope of the appended claims without departing from the spirit of the invention.

I claim:

1. The combination with a vehicle having a load supporting portion consisting of only guide and supporting rails horizontally positioned, of a plurality of flat body sections designed to support load units, and means for individually raising each body section with its load always in a substantially horizontal position and for depositing it on the rails, the sections and load units abutting one another and forming a continuous body and a single load when placed on the vehicle rails.

2. The combination with a vehicle having a load supporting portion consisting of only guide and supporting rails horizontally positioned, of a plurality of flat body sections designed to support load units, and means for individually raising each body section with its load always in a substantially horizontal position and for depositing it on the rails, the sections and load units abutting one another and forming a continuous body and a single load when placed on the vehicle rails, a trailer removably connected to the vehicle and having a load supporting portion consisting of only guide and supporting rails, and means for moving the sections with their loads off from the vehicle and onto the trailer as a unit.

3. The combination with a vehicle having body supporting members extending throughout the length of the vehicle, of a plurality of flat body sections, each designed to support a load unit, means carried by and projecting beyond the rear of the vehicle for individually raising each body section with its load and for depositing it on the members, the sections and load units forming a continuous vehicle body and a single load, when placed on the members, that extends throughout the lengths of the members, said means being adapted to lift and support an additional body section with its load, whereby the load carried by the vehicle is increased, a trailer removably connected to the vehicle and having body supporting members designed to carry the body sections carried by the vehicle and by the lifting means, said means being adapted to lower its body section onto the trailer, and means for moving this section together with all the others as a unit from the vehicle and onto the trailer.

4. A load lifting device for vehicles comprising a pair of carriers, means for removably securing the carriers to a loaded deck, cables for lifting the carriers with the deck, rollers on the carriers, gravity rails, means for swinging portions of the rails outwardly to permit the carriers to pass thereby, said swinging portions supporting the rollers, carriers and decks when the cables are slacked, the rails guiding the deck onto the vehicle.

5. A load lifting device for vehicles comprising a pair of carriers designed to be connected to a loaded deck, cables supporting the carriers, means for lifting the cables for raising the deck while supporting the latter in a horizontal position, rails for supporting the carriers after the cables have raised the carriers into a position to be supported by the rails, said rails guiding the deck onto the vehicle while still holding the deck in a horizontal position.

6. A load lifting device for vehicles comprising a pair of carriers designed to be connected to a loaded deck, cables supporting the carriers, means for lifting the cables for raising the deck while supporting the latter in a horizontal position, rails for supporting the carriers after the cables have raised the carriers into a position to be supported by the rails, said rails guiding the deck onto the vehicle while still holding the deck in a horizontal position, endless chains carried by the vehicle and supporting the deck after it has been freed from the rails, and means for moving the deck along the vehicle.

7. A load lifting device for vehicles comprising a deck for supporting a load, a pair of carriers adapted to straddle the load and to be removably connected to the sides of the deck, gravity rails for slidably supporting the carriers, and means for lifting the carriers with the loaded deck onto the rails, said means permitting the carriers to slide along the rails until the deck is deposited on the vehicle.

8. A load lifting device for vehicles comprising a deck for supporting a load, a pair of carriers adapted to straddle the load and to be removably connected to the sides of the deck, gravity rails for slidably supporting the carriers, and means for lifting the carriers with the loaded deck onto the rails, said means permitting the carriers to slide along the rails until the deck is deposited on the vehicle, and means for moving the deck on the vehicle after it has been freed from the carriers.

9. The combination with a vehicle, of means for lifting a loaded deck onto the vehicle while supporting the deck in a horizontal position during this movement, said means offering no obstruction to the load on the deck regardless of its height, means for moving the deck on the vehicle to make room for a second loaded deck, said lifting means placing a second loaded deck adjacent to the first loaded deck, said first and second named means being operated until the entire vehicle is filled with decks and their loads, the decks when on the vehicle abutting each other and constituting the vehicle bed and the loads also abutting each other and constituting a single load.

10. A lifting device for vehicles comprising means supported by the vehicle for lifting a loaded deck into a predetermined position, a support carried by the vehicle and being swingable into a position for carrying the load raised by the lifting means, said support carrying the load and permitting it to be moved onto the vehicle.

11. A load lifting device for vehicles comprising rails swingably carried by the vehicle and being movable outwardly in a lateral direction to permit a load to pass therebetween, a load carrying deck, means carried by the vehicle for lifting the loaded deck between the rails, said rails being swingable into a position to support the deck after the load has passed, and to guide the deck down upon the vehicle.

12. A lifting device for vehicles comprising rails swingable outwardly in a lateral direction, a load carrying deck, means for raising the deck between the rails when they are moved outwardly, said means supporting the deck in a horizontal position, said rails being subsequently movable for supporting the means, and for permitting it to move the deck onto the vehicle while still holding the deck in a horizontal position, and means for moving the deck on the vehicle after being freed from the rails.

13. A load lifting device for vehicles comprising a pair of carriers, means for removably securing the carriers to a loaded deck, cables for lifting the carriers with the deck, rollers on the carriers, gravity rails, means for swinging portions of the rails outwardly to permit the carriers to pass thereby, said swinging portions supporting the rollers, carriers and decks when the cables are slacked, the rails guiding the deck onto the vehicle, and means for moving the deck on the vehicle after it has been freed from the carriers.

ROBERT H. BERG.